April 29, 1958     E. J. FANTON     2,832,432
WET DUST COLLECTOR

Filed May 28, 1954     2 Sheets-Sheet 1

INVENTOR.
ERIC J. FANTON
BY
HIS ATTORNEYS

April 29, 1958

E. J. FANTON 2,832,432

WET DUST COLLECTOR

Filed May 28, 1954

2 Sheets-Sheet 2

INVENTOR.
ERIC J. FANTON
BY
HIS ATTORNEYS

United States Patent Office 2,832,432
Patented Apr. 29, 1958

2,832,432
WET DUST COLLECTOR

Eric J. Fanton, Hagerstown, Md., assignor to Pangborn Corporation, Hagerstown, Md., a corporation of Maryland Application May 28, 1954, Serial No. 433,028

10 Claims. (Cl. 183—24)

This invention relates to dust collectors such as are used in cleaning and purifying air in industrial atmospheres, although it may be applied to the washing and cleaning of gases or entrained matter or both and the separation of one from the other, or otherwise. The invention more specifically relates to the so called "wet collection" of dust or other particulate matter contained in contaminated air.

In order to have an efficient wet collection of "dust," it is advisable to provide very fine particles of liquid and then thoroughly mix the air stream containing the dust with these particles, ensuring the transfer of the dust from the air to the liquid.

An object of this invention is to provide a method and apparatus for breaking up the water, or other suitable liquid, into fine particles and thoroughly mixing these particles with dust laden air by means of the movement of the air itself and without the use of any mechanical means.

Figure 1:
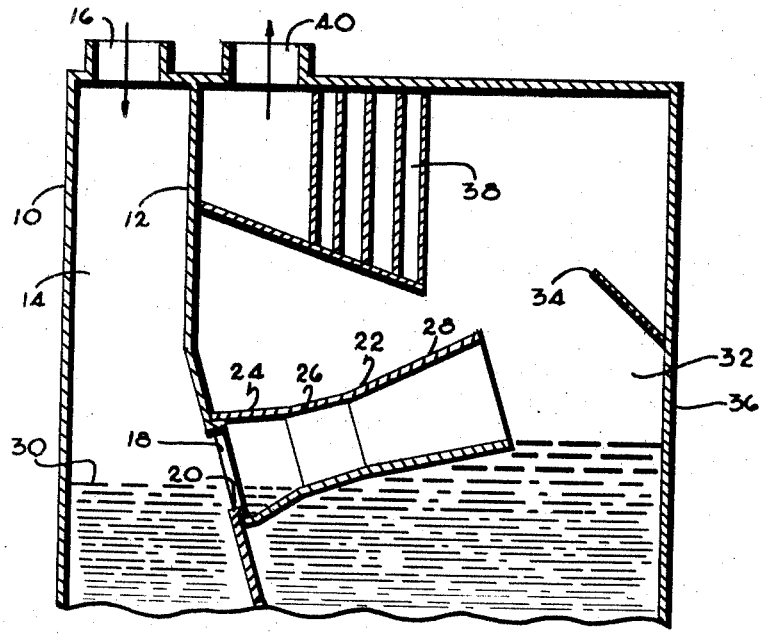
Figure 2:
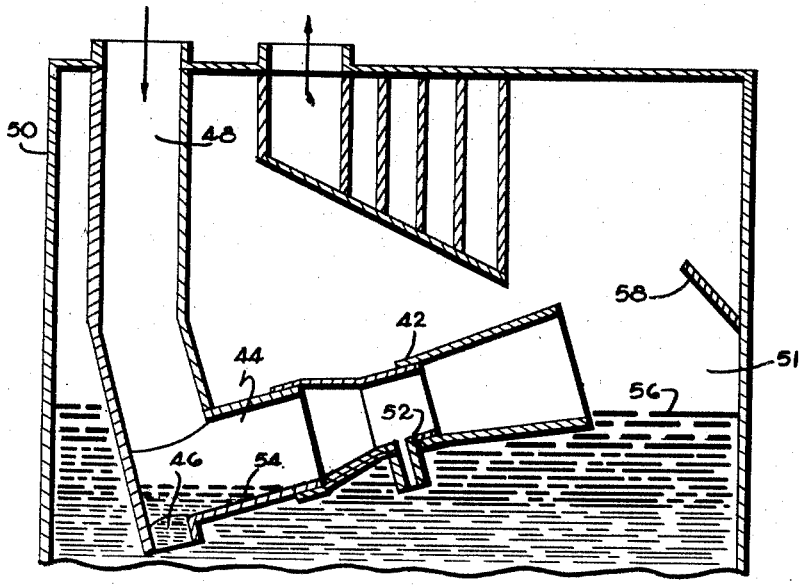
Figure 3:
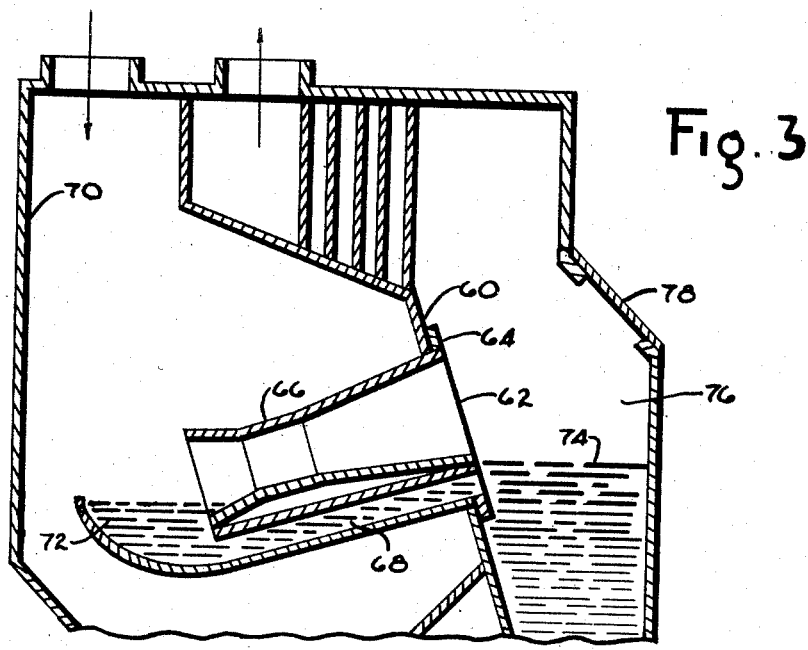
Figure 4:
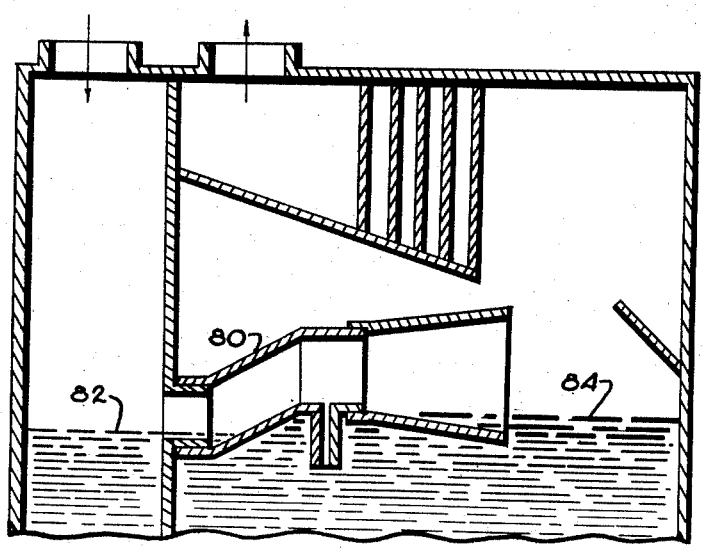

Other objects, and many of the attendant advantages of this invention, will be readily appreciated as the same becomes better understood by reference to the following detailed description when considered in connection with the accompanying drawings wherein:

Fig. 1 is a sectional view of the chamber showing the venturi tube and its related parts, Fig. 2 is a view similar to Fig. 1 but showing a modification of the air inlet means and the liquid inlet means, Fig. 3 is a view similar to Fig. 1 showing a third modification of the invention, and Fig. 4 is a view of a different arrangement of the venturi tube.

In accordance with the present invention, the dust laden air is passed through a chamber wherein a venturi type tube is provided in the path of the air in such a way that the air must pass therethrough. Means are provided to supply an adequate amount of liquid, such as water, to the venturi tube by the air movement and corresponding air pressure and liquid level variations. As the air passes into the venturi tube, the low pressure area in the venturi throat induces the water to enter into the high velocity air stream passing through the venturi throat. The subsequent turbulence of the water caused by its mixing with the high velocity air stream breaks the water into relatively minute particles and, at the same time, thoroughly mixes the dust particles in the air stream with these water particles. The water particles, carrying the entrained dust particles therewith, are then ejected at a high velocity out of the outlet end of the venturi tube. Due to the evase discharge cone of the venturi tube, the air stream leaves the outlet end of the tube at a much lower velocity than the now contaminated water and separation of the air from the water is effected by the impingement of the ejected water against a wettable surface which is very effective in settling the water and entrained dust to a suitable chamber. The cleaned air stream is then passed through an eliminator section where the remaining very fine particles of water are removed. The purified air is then caused to be removed from the housing by suction means or the like while the settled dust, in the form of sludge, can be either manually or mechanically removed from the settling chamber.

Referring now in greater detail to the drawings wherein similar reference characters refer to similar parts; there is shown in Fig. 1 a housing 10 having an interior partition wall 12 which, in conjunction with the outer wall of the housing, defines a passage 14 at the top of which there is provided an air inlet 16. The inlet 16 is adapted to either be, itself, positioned within the dust laden atmosphere, or to be connected by any suitable means, with a conduit which is used to convey the dust laden air from its source to the chamber.

At the lower portion of the partition wall 12, there is provided an opening 18 defined by a peripheral flange 20. Connected to the flange 20 by any suitable means such as by welding, bolting, or the like is a venturi tube generally designated 22. This venturi tube 22 comprises a conical inlet portion 24, a narrow throat portion 26 and a conical discharge portion 28. These three portions of the tube may either be formed integrally with each other or may be separably connected. A body of water 30 is maintained at a predetermined level, in relation to the tube 22, in the passage 14 and in the chamber 32, the difference of levels in the passage 14 and chamber 32 being due to the different air pressures therein. The feed of the water into the tube inlet is assisted by the flow of air into the tube creating a low pressure area.

An impingement plate 34 extends from the interior surface of the wall 36 of the housing in opposing relationship to the outlet end of the venturi tube. This impingement or baffle plate acts to separate the bulk of the dust-laden water particles from the air by causing the droplets to strike it and stick to it to form a film that runs down into the tank. In addition, the baffle plate blocks the forward movement of the particles and deflects them toward the bottom of the tank which is provided with suitable means for returning a supply of water to the passage 14. The purified air, on the other hand, is drawn off, through water particle eliminator plates 38, where very fine droplets are deposited, thence through the suction opening 40, this opening 40 being attached to a suction device, not shown.

The tube 22 is designed with an evase discharge for the maximum reclamation of pressure loss by means of the phenomenon known as "static regain." In a specific example, the throat of the venturi was made four inches in diameter and four inches long; the tapered inlet 24 extending at a 30° included angle and being six inches in diameter at the widest end while the evase discharge 28 extended at an included angle of 14° and was made 6½ inches in diameter at the widest end. The tube, made according to such dimensions, handled 700 C. F. M. of air with optimum efficiency. However, it should be borne in mind that this invention is neither limited to the size and proportions nor cross-sectional shape of the tube, set forth in the specific example. Different sizes may require different proportions and the tube cross-section may be rectangular or polygonal in order to give the most efficient results and/or the most economical equipment according to the specific requirements of the individual application.

A modification of the invention is illustrated in Fig. 2 where the venturi tube 42, similar to the tube 22, is illustrated as being connected, at its inlet end, to a housing 44, cylindrical in shape and having a diameter approximately equal to the diameter of the widest end of the inlet portion of the tube 42; it is connected to that end of the tube by any suitable means. The housing 44 has a water inlet nipple 46 extending from the bottom thereof and a dust-laden air intake tube 48 extending from the top thereof. The tube 42, housing 44 and water and air inlets 46 and 48 are all positioned within a housing 50 similar to housing 10; however, the inlets 46 and 48 are substituted for the lower and upper portions of the passage 14 shown in Fig. 1. This provision of separate air and water inlet tubes has the advantage that the separate tubes may be made separable from the housing 44 or integral with the housing 44 which may be made separable from the venturi tube. In addition, the housing 44, venturi tube 42 and the water and air inlets 46 and 48 may all be separable from the housing 50. This arrangement allows for the venturi tube and its associated housing to be added to a simple suitable water tank, provided with suction means and sealed against air leakages.

In addition to the water inlet 46, a water inlet nipple 52 is illustrated as being directly connected to the lower pressure throat portion of the venturi tube 42. Although both water inlets 46 and 52 are illustrated, it is not necessary in all instances to keep them both open. As a matter of fact, it has been found more economically feasible, in most instances, to close the inlet 52. However, there are many applications where this water feed into the throat portion is desirable. It is also possible to provide a water inlet similar to inlet 52, at the throat 26 of the venturi tube 22 of Fig. 1, if desired.

The assembly of Fig. 2 is used similarly to that of Fig. 1 in that a body of water is maintained at a pre-determined level 54 in the housing 44, with a varied level 56 in the main chamber 51 formed by the housing 50, due to the difference in air pressures between the two. A third different air pressure induces water into the venturi tube throat through the inlet 52, where this is fitted.

In operation, the dust-laden air is conducted through an inlet opening at the top of tube 48 and through the housing 44 above the water level 54. When the air enters the throat of the venturi tube, the consequent increase of velocity and decrease of static pressure sucks the water into the air-stream and the consequent turbulence of the water causes its break-up into small particles which are thoroughly mixed with the air, the subsequent mixture of air and water being ejected from the venturi tube and against the baffle plate 58, where the impingement of the dust-laden water takes place; all as generally described above in relation to the operation of the device of Fig. 1.

In Fig. 3 there is illustrated a modification of the structure shown in Fig. 1 together with a modified and novel method of water feed to the venturi tube inlet. In this case, the partition wall 60 is arranged at the discharge end of the venturi tube, the said wall having opening 62 within which is adapted to be positioned the peripheral flange 64 of the venturi tube 66. Similarly to tube 22 in Fig. 1, tube 66 is connected by welding or other suitable means to the partition wall 60. A suitably sized water feed duct 68 is arranged to be fitted either to the discharge end of the venturi tube 66, as illustrated, or to the partition 60 immediately below the venturi tube. This water duct could be individually fitted to each venturi tube or be of suitable length to form a common feed duct to a number of aligned tubes. The advantages of this method of water feed are, that it eliminates the necessity for a large water tank, and provides a better control of the water feed to the tubes. This method of water feed actually extends the range of duty of the tube before collecting efficiencies are impaired, as the surge of a large mass of water is eliminated, giving constant flow. With the above arrangement the chamber 70 can be used as a primary settling chamber for heavy dust particles to be collected dry or, where desired, a suitable amount of water can be used to collect these heavy particles in a wet state. The modified device functions as described for the device shown in Fig. 1, the relative water levels 72 and 74 being maintained in a pre-determined relation to the venturi tube 66, they being different by reason of the different air pressures in chambers 70 and 76. The discharged water settles its contained dust in chamber 76 and returns via the duct 68 to maintain the level at 72 which, again, is controlled in relation to the venturi tube and the level 74 by the variation of air pressure. In this illustration the baffle 78 also takes the form of an access door which is conveniently positioned for cleaning and maintenance purposes.

In Fig. 4 the venturi tube is shown horizontal and the inlet cone 80 has been modified to compensate for the different water levels 82 and 84. This arrangement may be embodied in the devices illustrated by Figs. 1, 2 and 3 where desired.

Although water has been described as the liquid in the venturi tube, the invention is not limited to water, but various other suitable types of liquid may advantageously be used. Oily liquids, for example, are preferred for the collection of certain very fine and lighter dusts.

The scope of this invention is not limited to the illustrations of arrangement given; for example, the venturi tube may be positioned with a vertical axis, taking in the air and water at the bottom and discharging it from the top.

It is also within the scope of this invention to provide means for keeping the water level at a pre-determined level. Such means may take the form of water level operated valves to feed and/or drain the water automatically as required.

In addition, means may be provided for the manual or mechanical removal of sedimentations from the bottom of the water tank.

Obviously modifications and variations of the present invention are possible in the light of the above teachings. It is, therefore, to be understood that within the scope of the appended claims the invention may be practiced otherwise than as specifically described.

What is claimed in this invention is:

1. A dust collection device comprising a substantially closed dust collection chamber having substantially straight vertical walls, inlet means leading into and outlet means leading from said chamber, and purifying means to entrain liquid particles within a rapidly moving stream of dust-laden air as said stream moves from the inlet to the outlet means, said purifying means including a venturi tube having an evase discharge end, the relationship between the chamber and the venturi tube being such as to provide a static body of liquid within at least a portion of said venturi tube, and a passage connected between said inlet means and said venturi tube and arranged to conduct said stream of dust-laden air from said inlet means directly into said venturi tube adjacent the surface of the static body of liquid, an impingement means having a plane surface spaced from the discharge end of said venturi tube, said venturi tube being constructed and arranged to then conduct said stream, with liquid particles from said static body of liquid entrained therein, in a straight path to impinge against said plane surface at an angle which intersects the flow path of said stream for separating the dust and liquid particles from the air.

2. The device of claim 1 wherein means are provided to feed said liquid into said venturi tube at the inlet end thereof.

3. The device of claim 2 wherein additional liquid inlet means are provided at the narrow throat portion of said venturi tube.

4. The device of claim 1 wherein there is a means to maintain said static body of liquid said means being connected to a liquid reservoir in such a manner that when any part of said static body of liquid is induced to enter into said stream of air, an equivalent amount of liquid is conducted from said reservoir to said venturi tube.

5. The device of claim 1 wherein said impingement means is an inclined baffle plate arranged opposite the outlet end of said venturi tube.

6. A dust collection device comprising a substantially closed chamber, having substantially straight vertical walls, an inlet and outlet means leading from said chamber, a housing within said chamber, a conduit connecting said housing to said inlet means, a liquid inlet on said housing in opposed relationship to said conduit, and a venturi tube having an evase discharge end, connected at one end to said housing and in fluid communication therewith, said venturi tube extending away from said inlet in a substantially straight path, and having at least one portion thereof inclined upwardly from said inlet said liquid inlet being adapted to provide a substantially static body of liquid in at least a portion of said venturi tube, and a substantially straight, inclined impingement plate intersecting the direct path of fluid flow from the outlet end of the venturi tube.

7. The device of claim 6 wherein said housing is separably connected to said venturi tube.

8. The device of claim 6 wherein a second liquid inlet is provided at the narrow throat portion of said venturi tube.

9. The device of claim 1 wherein said venturi tube is provided with an offset portion between the ends thereof.

10. The device of claim 1 wherein a second passage connects said static body of liquid to the inlet end of said venturi tube.

References Cited in the file of this patent

UNITED STATES PATENTS

| | | |
|---|---|---|
| 2,171,574 | Lambert et al. | Sept. 5, 1939 |
| 2,383,138 | Ludwig | Aug. 21, 1945 |
| 2,399,629 | Fisher | May 7, 1946 |
| 2,459,635 | Fenn | Jan. 18, 1949 |